United States Patent
Seol et al.

(10) Patent No.: US 11,964,298 B2
(45) Date of Patent: Apr. 23, 2024

(54) SLOT DIE COATING DEVICE FOR ELECTRODE PRODUCTION

(71) Applicant: LG Energy Solution, Ltd., Seoul (KR)

(72) Inventors: Jeong Soo Seol, Daejeon (KR); Hwan Han Kim, Daejeon (KR); Seok Ju Chang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/920,207

(22) PCT Filed: May 4, 2021

(86) PCT No.: PCT/KR2021/005580
§ 371 (c)(1),
(2) Date: Oct. 20, 2022

(87) PCT Pub. No.: WO2021/241902
PCT Pub. Date: Dec. 2, 2021

(65) Prior Publication Data
US 2023/0158538 A1 May 25, 2023

(30) Foreign Application Priority Data
May 28, 2020 (KR) .................. 10-2020-0064320

(51) Int. Cl.
*B05C 5/02* (2006.01)
*B05C 1/08* (2006.01)

(52) U.S. Cl.
CPC ............. *B05C 5/0254* (2013.01); *B05C 1/08* (2013.01)

(58) Field of Classification Search
CPC ................................ B05C 1/08; B05C 5/0254
See application file for complete search history.

(56) References Cited

U.S. PATENT DOCUMENTS 3,893,410 A 7/1975 Herzhoff et al.
3,907,014 A * 9/1975 Manino .................. B25B 23/10
81/433

(Continued)

FOREIGN PATENT DOCUMENTS

CN 109876935 A 6/2019
CN 110198792 A 9/2019

(Continued)

OTHER PUBLICATIONS

Search Report dated Mar. 18, 2023 from the Office Action for Chinese Application No. 202180027182.X dated Mar. 22, 2023, pp. 1-3. [See p. 2, categorizing the cited references].

(Continued)

*Primary Examiner* — Karl Kurple
(74) *Attorney, Agent, or Firm* — Lerner David LLP (57) ABSTRACT

A slot die coating device according to one embodiment of the present disclosure includes a slot die coater forming an internal space for housing an electrode slurry and a discharge passage in communication with the internal space to discharge the electrode slurry; and a block positioned in the internal space, wherein a first distance defined between a first inside portion and a second inside portion forming the internal space is greater than a second distance defined between a first discharge inside portion and a second discharge inside portion forming the discharge passage, and wherein the block comprises a first block facing the first inside portion and a second block facing the second inside portion.

14 Claims, 6 Drawing Sheets

(56) References Cited

U.S. PATENT DOCUMENTS

| | | | |
|---|---|---|---|
| 5,501,737 A | | 3/1996 | Takahashi et al. |
| 5,700,325 A | * | 12/1997 | Watanabe ............. B05C 5/0254 |
| | | | 118/411 |
| 2007/0235679 A1 | * | 10/2007 | Sutliff ................... F16K 1/2007 |
| | | | 251/317.01 |
| 2011/0287171 A1 | | 11/2011 | Seo et al. |
| 2015/0053133 A1 | * | 2/2015 | Park ...................... B05C 5/0254 |
| | | | 118/410 |
| 2019/0374971 A1 | | 12/2019 | Horinouchi et al. |

FOREIGN PATENT DOCUMENTS

| | | |
|---|---|---|
| EP | 2390011 A2 | 11/2011 |
| EP | 3578272 A1 | 12/2019 |
| JP | H06114317 A | 4/1994 |
| JP | H09094507 A | 4/1997 |
| JP | 2777094 B2 | 7/1998 |
| JP | 2001029860 A | 2/2001 |
| JP | 2004174489 A | 6/2004 |
| JP | 2009273997 A | 11/2009 |
| JP | 5395391 B2 | 1/2014 |
| JP | 2014188435 A | 10/2014 |
| JP | 2018069230 A | 5/2018 |
| JP | 2018089599 A | 6/2018 |
| KR | 100709228 B1 | 4/2007 |
| KR | 20070092384 A | 9/2007 |
| KR | 101011946 B1 | 1/2011 |
| KR | 20150009463 A | 1/2015 |
| KR | 20150031167 A | 3/2015 |
| KR | 101762813 B1 | 7/2017 |
| KR | 20180133700 A | 12/2018 |
| KR | 101952598 B1 | 2/2019 |

OTHER PUBLICATIONS

Extended European Search Report including Written Opinion for Application No. 21814197.6 dated Aug. 2, 23, pp. 1-7.

International Search Report for Application No. PCT/KR2021/005580 dated Aug. 23, 2021, pp. 1-3.

Search Report dated Nov. 29, 2023 from the Office Action for Chinese Application No. 202180027182.X issued Dec. 1, 2023, pp. 1-3.

* cited by examiner

SLOT DIE COATING DEVICE FOR ELECTRODE PRODUCTION

CROSS-REFERENCE TO RELATED APPLICATIONS

The present application is a national phase entry under 35 U.S.C. § 371 of International Application No. PCT/KR2021/005580, filed on May 4, 2021, which claims priority from Korean Patent Application No. 10-2020-0064320 filed on May 28, 2020, with the Korean Intellectual Property Office, the disclosures of which is incorporated herein by reference in its entirety.

TECHNICAL FIELD

The present disclosure relates to a slot die coating device, and more particularly, to a slot die coating device for electrode production.

BACKGROUND

As energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, the demand for batteries as energy sources is rapidly increasing as mobile device technology continues to develop and the demand for such mobile devices continues to increase. Accordingly, much research on batteries capable of satisfying various needs has been carried out. In particular, in terms of the material for batteries, the demand for lithium secondary batteries, such as lithium ion batteries and lithium ion polymer batteries, which have advantages such as high energy density, discharge voltage, and output stability, is very high.

A secondary battery includes an electrode assembly having a structure, in which a positive electrode, a negative electrode, and a separator interposed between the positive electrode and the negative electrode are stacked, and the electrode assemblies are received in a pouch case, a cylindrical can, a prismatic case, and the like depending on the purpose of use to manufacture the battery.

The positive electrode and the negative electrode are manufactured by coating a positive electrode slurry and a negative electrode slurry onto an electrode current collector formed of an aluminum foil and a copper foil, and drying the slurry. In order to make the charge and discharge characteristics of the secondary battery uniform, a positive electrode active material slurry and a negative electrode active material slurry have to be uniformly coated onto the current collector, and for this purpose, a slot die coating process may be commonly performed.

The slot die coating device for the slot die coating process may include a slot die coater as an equipment for coating the electrode slurry onto the electrode current collector.

The slot die coater refers to a device that supplies a liquid fluid with fluidity (slurry, adhesive, hard coating agent, ceramic, etc.) between the upper and lower slot dies via a pulsation-free pump or a piston pump, and coats a material on an object to be coated such as fabric, film, glass plate, and sheet moving in one direction with a certain thickness.

The slot die coater for electrode production refers to a configuration in which a slot die coater is applied for electrode production, and an electrode slurry, which is a supply fluid, is coated onto an electrode current collector in order to make an electrode of a secondary battery.

The flow rate distribution in the width direction of the electrode slurry may differ depending on the process conditions and the shape of the slot die. Thus, in order to obtain a coating layer having a uniform thickness, it is necessary to properly design the shape of each part of the slot die coater for electrode production.

In order to shorten the time required for the drying process and secure the productivity of the electrode, an active material and a conductive material are mixed with the electrode slurry in a high ratio, so that the electrode slurry has a high viscosity.

Depending on the shape of the flow path in all sections from a mixing tank that stores and supplies the electrode slurry to the slot die coater, the electrode slurry can be stagnant or have a very low flow rate.

The width of the electrode slurry coated varies depending on the model of the electrode to be manufactured, and the internal pressure of the slot die coater may increase when manufacturing the electrode having a small width of the electrode slurry. As the internal pressure of the slot die coater increases, a problem may occur in which the amount of electrode slurry to be coated is not uniform in the width direction, or the electrode slurry is leaked.

Therefore, there is a need to develop a slot die coating device having an improved structure capable of solving these problems.

DETAILED DESCRIPTION OF THE INVENTION

Technical Problem

It is an object of the present disclosure to provide a slot die coating device that can reduce the pressure inside the slot die coater to uniformly coat an electrode slurry and can prevent leakage of electrode slurry.

However, the problem to be solved by the embodiments of the present disclosure is not limited to the above-described problems, and can be variously expanded within the scope of the technical idea included in the present disclosure.

Technical Solution

According to one embodiment of the present disclosure, there is provided a slot die coating device comprising: a slot die coater configured to form an internal space for housing the electrode slurry and a discharge passage connected to the internal space to discharge the electrode slurry; and a block located in the internal space, wherein a distance between the first inside portion and the second inside portion forming the internal space is formed longer than a distance between the first discharge inside portion and the second discharge inside portion forming the discharge passage, and wherein the block comprises a first block facing the first inside portion and a second block facing the second inside portion.

A distance between the first block and the second block may be equal to or longer than a distance between the first discharge inside portion and the second discharge inside portion.

One surface of the first block may face the first inside portion, and the other surface of the first block may form a surface parallel to the first discharge inside portion.

One surface of the second block may face the second inside portion, and the other surface of the second block may form a surface parallel to the second discharge inside portion.

The first block may be in contact with the first inside portion, and the second block may be in contact with the second inside portion.

The block may include at least one of MC nylon (Mono cast nylon) and TEFLON® (Polytetrafluoroethylene, PTFE).

The slot die coater may include an upper die, a lower die, and a plate-shaped shim portion located between the upper die and the lower die.

The shim portion may include a first side portion and a second side portion connected in parallel to each other; a central portion that connects the first side portion and the second side portion; and a first protrusion portion and a second protrusion portion each protruding from one end of the first side portion and one end of the second side portion in opposite directions in a direction facing each other, wherein the first protrusion portion and the second protrusion portion may form the discharge passage.

The first side portion may form at least a part of the first inside portion, and the second side portion may form at least a part of the second inside portion.

The discharge passage may be connected up to an outer surface of the slot die coater to form a discharge port.

The slot die coating device may further include a roller that moves in one direction the electrode current collector on which the electrode slurry is coated.

Advantageous Effects

According to embodiments of the present disclosure, both the pressure and the pressure deviation inside the slot die coater can be reduced through a block disposed inside the slot die coater. Therefore, the electrode slurry can be uniformly coated, and leakage of the electrode slurry can be prevented.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail with reference to the accompanying drawings so that those skilled in the art can easily implement them. The present disclosure can be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

Further, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 1:
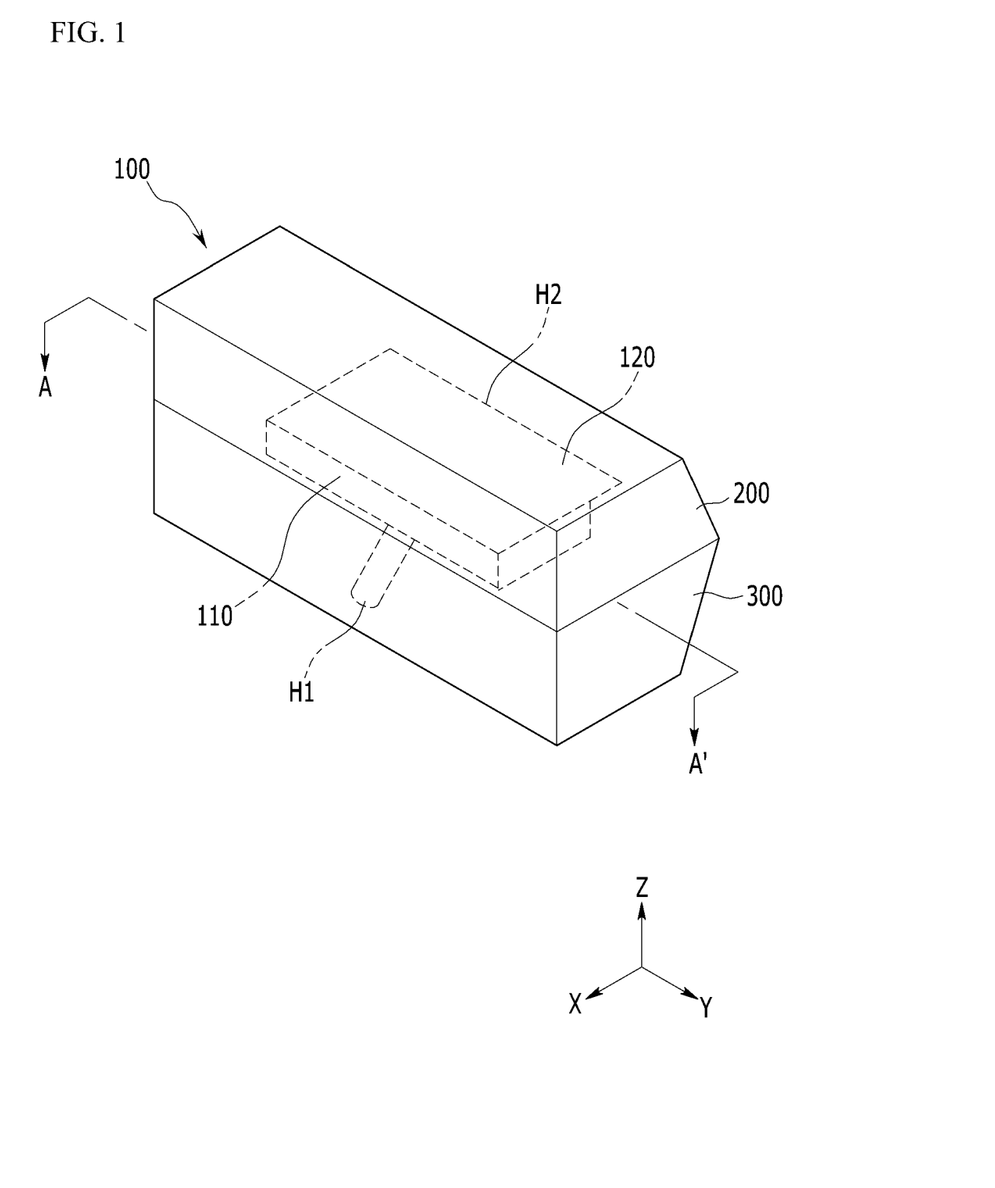
FIG. 1 is a perspective view of a slot die coater according to an embodiment of the present disclosure.
Figure 2:
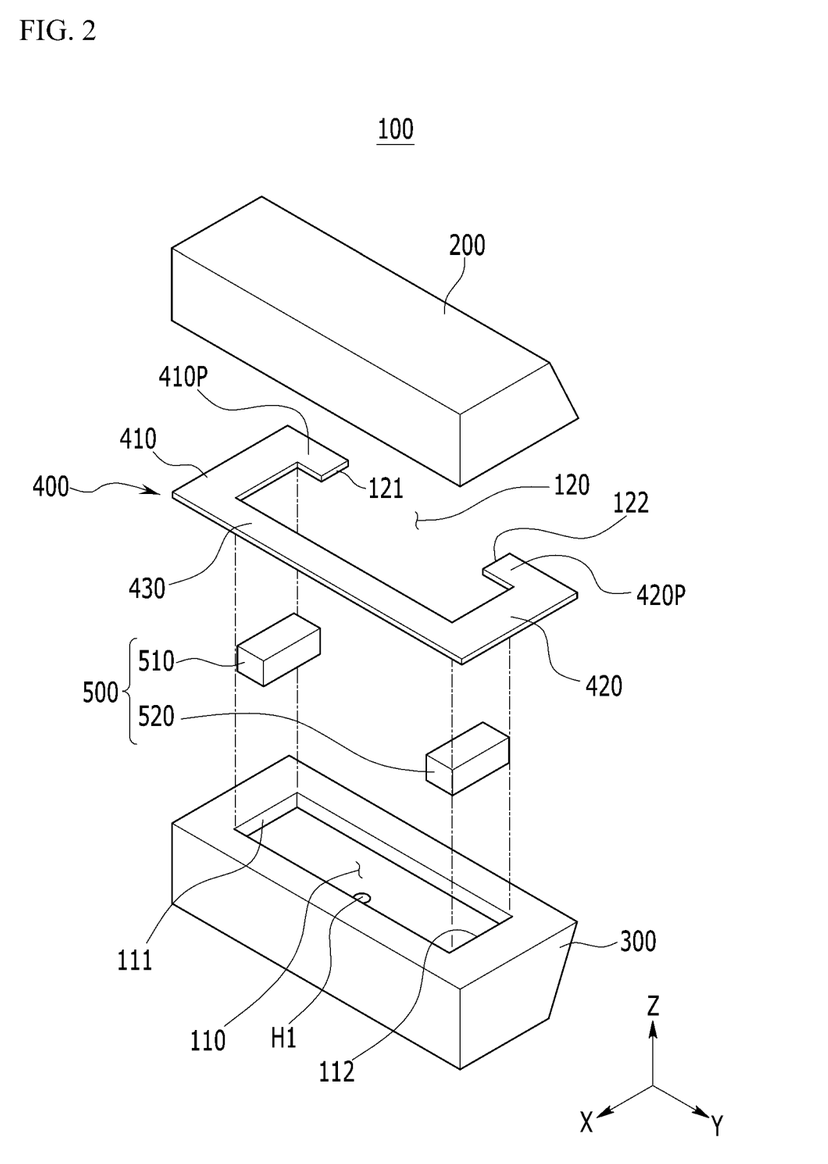
FIG. 2 is an exploded perspective view of the slot die coater of FIG. 1.
Figure 3:
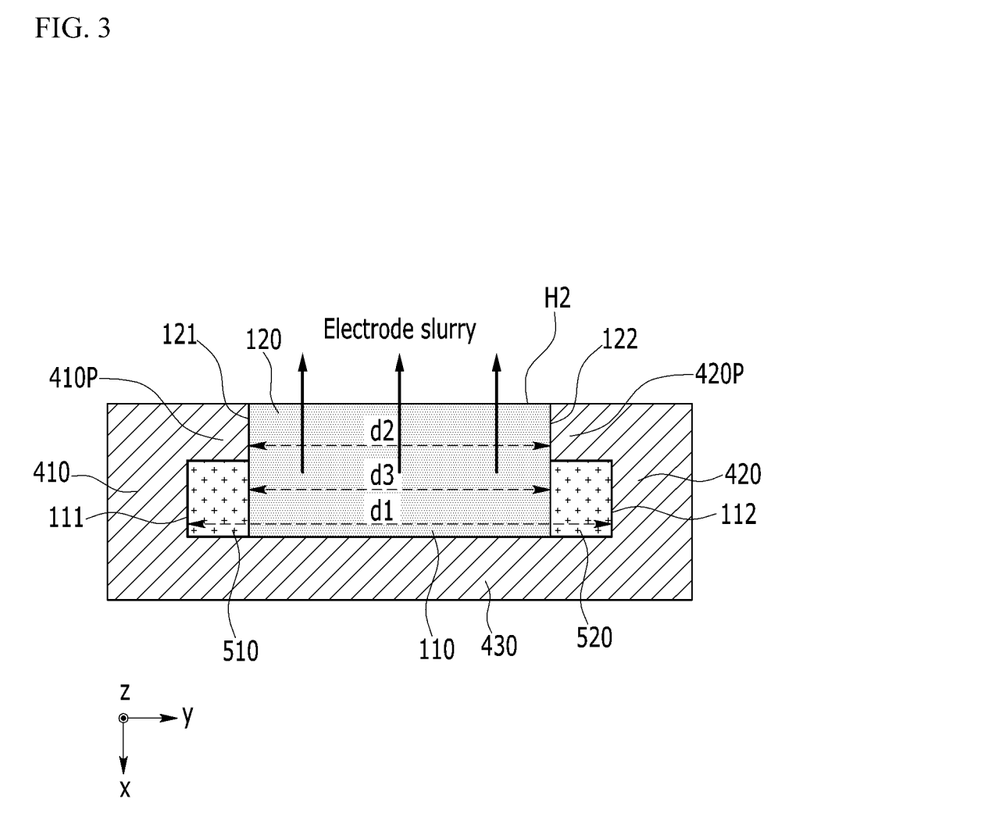
FIG. 3 is a cross-sectional view taken along the cutting line A-A' of FIG. 1.

FIG. 1 is a perspective view of a slot die coater according to an embodiment of the present disclosure. FIG. 2 is an exploded perspective view of the slot die coater of FIG. 1. FIG. 3 is a cross-sectional view taken along the cutting line A-A' of FIG. 1.

Referring to FIGS. 1 to 3, the slot die coating device according to the embodiment of the present disclosure includes a slot die coater 100 configured to form an internal space 110 for housing the electrode slurry and a discharge passage 120 connected to the internal space 110 to discharge the electrode slurry; and a block 500 located in the internal space 110. A distance dl between the first inside portion 111 and the second inside portion 112 forming the internal space 110 is formed longer than a distance d2 between the first discharge inside portion 121 and the second discharge inside portion 122 forming the discharge passage 120, and the block 500 includes a first block 510 facing the first inside portion 111 and a second block 520 facing the second inside portion 112.

Here, the first inside portion 111 and the second inside portion 112 may mean internal side surfaces perpendicular to the y-axis in the internal space 110, and the first discharge inside portion 121 and the second discharge inside portion 122 may mean internal side surfaces perpendicular to the y-axis in the discharge passage 120. Meanwhile, the internal space 110 may mean a manifold, that is, a volume space occupied by the coating solution of the electrode slurry inside the slot die coater 100 in the slot die coating process.

The slot die coater 100 may include an upper die 200, a lower die 300, and a plate-shaped shim portion 400 located between the upper die 200 and the lower die 300.

The upper die 200 and the lower die 300 may be coupled to each other to form an internal space 110 in which the electrode slurry is housed. The lower die 300 is provided with a supply port H1 connected to the internal space 110 of the slot die coater 100. The liquid electrode slurry may pass through the supply port H1 via a pulsation-free pump, a piston pump, or the like and move to the internal space 110.

The shim portion 400 is configured to determine the internal space 110 of the slot die coater 100 and the width of the coating, and may include a first side portion 410 and a second side portion 420 connected in parallel to each other; a central portion 430 that connects the first side portion 410 and the second side portion 420; and a first protrusion portion 410P and a second protrusion portion 420P each protruding from one end of the first side portion 410 and one end of the second side portion 420 in opposite directions facing each other. The coating width of various electrode slurries can be realized by changing the size design value of the shim portion 400.

Specifically, the discharge passage 120 connected to the internal space 110 may be connected up to the outer surface of the slot die coater 100 to form the discharge port H2, and the electrode slurry may be discharged onto the electrode current collector via the discharge port H2. At this time, the first side portion 410 of the shim portion 400 forms at least a part of the first inside portion 111 of the internal space 110, and the second side portion 420 of the shim portion 400 may form at least a part of the second inside portion 112 of the internal space 110. Further, the first protrusion portion 410P and the second protrusion portion 420P may form the discharge passage 120. The distance between the first protrusion portion 410P and the second protrusion portion 420P determines the width of the discharge passage 120 and the discharge port H2. That is, the width of the discharge passage 120 and the discharge port H2 may be set by adjusting the distance between the first protrusion portion 410P and the second protrusion portion 420P of the shim portion 400. Therefore, the width of the electrode slurry coated on the electrode current collector may be changed by replacing the shim portion 400 between the upper die 200 and the lower die 300 according to the electrode model to be manufactured.

Thereby, as described above, the distance dl between the first inside portion 111 and the second inside portion 112 forming the internal space 110 is formed longer than the distance d2 between the first discharge inside portion 121 and the second discharge inside portion 122 forming the discharge passage 120. Here, the distance d2 between the first discharge inside portion 121 and the second discharge inside portion 122 may correspond to the distance between the first protrusion portion 410P and the second protrusion portion 420P of the shim portion 400.

As described above, the slot die coating device according to the present embodiment includes a block 500 located in the internal space 110 of the slot die coater 100, and the block 500 includes a first block 510 facing the first inside portion 111 and a second block 520 facing the second inside portion 112. The first block 510 and the second block 520 may be a rectangular parallelepiped—shaped structure having a constant volume.

Specifically, the distance d3 between the first block 510 and the second block 520 may be equal to or longer than the distance d2 between the first discharge inside portion 121 and the second discharge inside portion 122. Specifically, the distance d3 between the first block 510 and the second block 520 may be 1 to 1.2 times the distance d2 between the first discharge inside portion 121 and the second discharge inside portion 122. When the distance d3 between the first block 510 and the second block 520 is shorter than the distance d2 between the first discharge inside portion 121 and the second discharge inside portion 122, the electrode slurry is likely to be coated with a width smaller than the coating width of the designed electrode slurry, which is thus not preferable. Further, when the distance d3 between the first block 510 and the second block 520 exceeds 1.2 times the distance d2 between the first discharge inside portion 121 and the second discharge inside portion 122, the pressure inside the slot die coater 100 is not sufficiently reduced. Therefore, it is not possible to effectively prevent leakage of electrode slurry or improve wear of the slot die coater 100, which will be described later.

On the other hand, the two distances d2 and d3 are formed to be identical, so that one surface of the first block 510 faces the first inside portion 111, the other surface of the first block 510 may form a surface parallel to the first discharge internal portion 121, one surface of the second block 520 faces the second inside portion 112, and the other surface of the second block 520 may form a surface parallel to the second discharge inside portion 122.

Hereinafter, the slot die coater 100 including the block 500 according to the present embodiment will be described in comparison with the slot die coater 10 according to the comparative example of the present disclosure shown in FIGS. 4 and 5.

Figure 4:
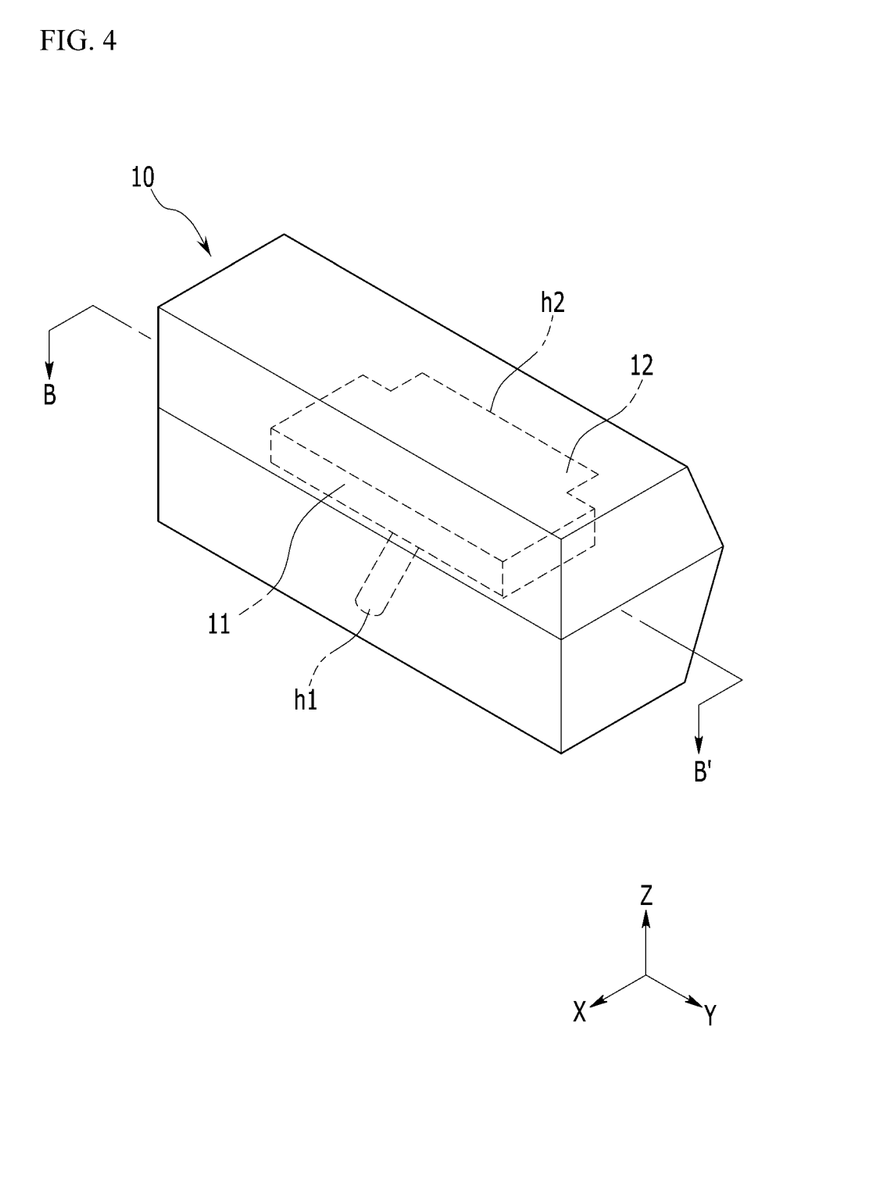
FIG. 4 is a perspective view of a slot die coater according to a comparative example of the present disclosure.

FIG. 4 is a perspective view of a slot die coater according to a comparative example of the present disclosure. FIG. 5 is a cross-sectional view taken along the cutting line B-B' of FIG. 4.

Figure 5:
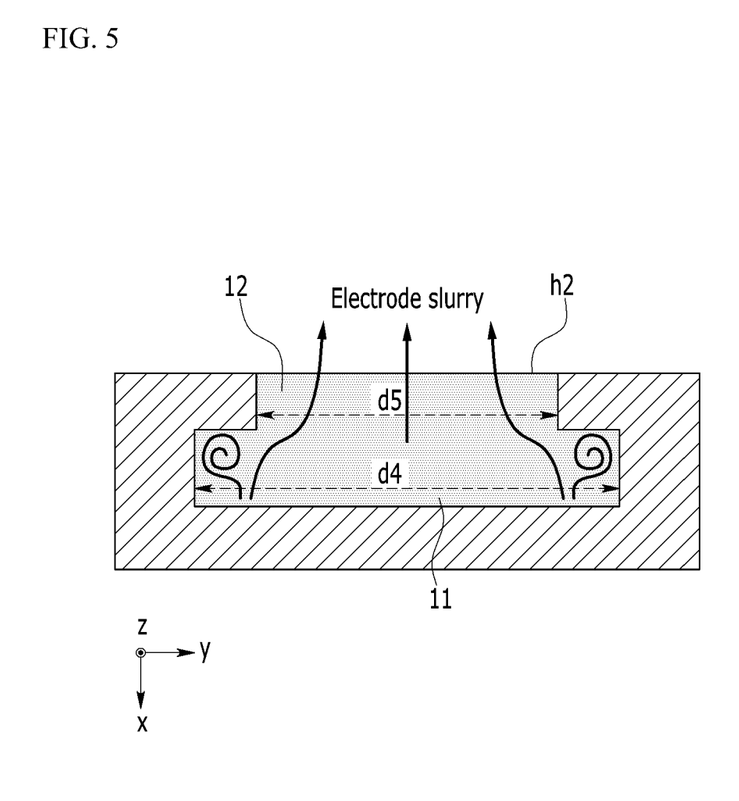
FIG. 5 is a cross-sectional view taken along the cutting line B-B' of FIG. 4.

Referring to FIGS. 4 and 5, the slot die coater 10 according to the present comparative example includes a supply port h1, an internal space 11, a discharge passage 12, and a discharge port h2. The electrode slurry that flows into the internal space 11 of the slot die coater 10 via the supply port h1 is coated onto the electrode current collector via the discharge passage 12 and the discharge port h2.

At this time, the distance d4 between both inside portions of the internal space 11 may be longer than the distance d5 between both inside portions of the discharge passage 12. A distance d4 between both inside portions of the internal space 11 corresponds to a distance d1 between the first inside portion 111 and the second inside portion 112 in the present embodiment, and a distance d5 between both inside portions of the discharge passage 12 corresponds to a distance d2 between the first discharge inside portion 121 and the second discharge inside portion 122.

In the slot die coater 10 according to the present comparative example, the distance d4 between both inside portions of the internal space 11 is formed to be long, so that the internal space 11 is formed to be relatively large. Thereby, the space occupied by the electrode slurry in the slot die coater 10 increases, and the pressure inside the slot die coater 10 increases. The increased pressure may cause problems such as leakage of the electrode slurry or wear of the slot die coater 10. Further, due to the difference in length between the distance d4 between both inside portions of the internal space 11 and the distance d5 between the both inside portions of the discharge passage 12, a pressure deviation may occur at both end portions and the central portion of the discharge passage 12 in the width direction (y-axis direction), and the electrode slurry may be non-uniformly coated onto the electrode current collector with reference to the width direction (y-axis direction).

On the other hand, the slot die coater 100 according to the present embodiment can physically reduce the space occupied by the electrode slurry in the internal space 110 by the block 500, and the pressure inside the slot die coater 100 can be reduced. Thereby, leakage of the electrode slurry can be prevented to reduce the loss of the electrode slurry, and the wear of the slot die coater 100 due to the pressure of the electrode slurry can be improved.

Further, the pressure deviation of the discharged electrode slurry can be reduced, so that the electrode slurry can be uniformly coated, which can lead to improved performance of the manufactured electrode.

Meanwhile, the first block 510 may be in contact with the first inside portion 111, and the second block 520 may be in contact with the second insider portion 112. That is, the first block 510 can be in contact with the first inside portion 111 in a state of being fitted into the first protrusion portion 410P, the first side portion 410 and the central portion 430, and the second block 520 may be in contact with the second inside portion 112 in a state of being fitted into the second protrusion portion 420P, the second side portion 420, and the central portion 430, so that the first block 510 and the second block 520 are stably fixed at predetermined positions in the internal space 110.

Meanwhile, the block 500 according to the present embodiment may include at least one of MC nylon (mono cast nylon) and TEFLON® (polytetrafluoroethylene, PTFE) in order to improve chemical resistance.

Figure 6:
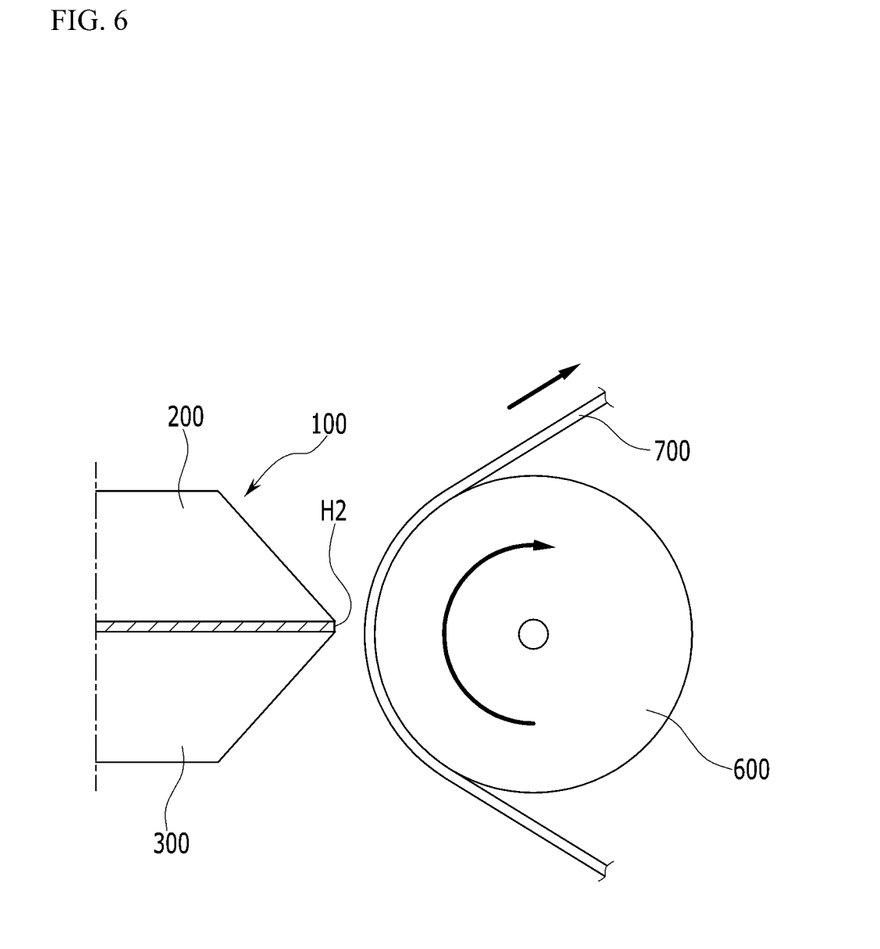
FIG. 6 is a plan view of a slot die coater and a roller according to an embodiment of the present disclosure.

FIG. 6 is a plan view of a slot die coater and a roller according to an embodiment of the present disclosure.

Referring to FIG. 6, the slot die coating device according to the present embodiment includes a slot die coater 100 including an upper die 200 and a lower die 300, and a roller 600 that moves in one direction the electrode current collector 700 on which the electrode slurry is coated.

The electrode slurry is discharged through the discharge port H2 of the slot die coater 100, and the electrode slurry can be coated to a constant thickness onto the electrode current collector 700 moving in one direction by the rotating roller 600.

Even though the terms representing directions such as front, rear, left, right, upper and lower directions are used herein, it is obvious to those skilled in the art that these merely represent for convenience in explanation, and may differ depending on a position of an observer, a position of an object, or the like.

Although preferred embodiments of the present disclosure have been described in detail above, the scope of the present disclosure is not limited thereto, and various modifications and improvements made by those skilled in the art using the basic concepts of the present disclosure, which are defined in the appended claims, also belong to the scope of the present disclosure.

DESCRIPTION OF REFERENCE NUMERALS

100: slot die coater
200: upper die
300: lower die
400: shim portion
500: block
510: first block
520: second block

The invention claimed is:

1. A slot die coating device comprising:
a slot die coater forming an internal space for housing an electrode slurry and a discharge passage in communication with the internal space to discharge the electrode slurry; and
a block positioned in the internal space,
wherein a first distance defined between a first inside portion and a second inside portion forming the internal space is greater than a second distance defined between a first discharge inside portion and a second discharge inside portion forming the discharge passage, and
wherein the block comprises a first block including a first surface facing the first inside portion and a second surface in contact with the first discharge inside portion, and wherein the block further comprises a second block facing the second inside portion.

2. The slot die coating device according to claim 1, wherein:
a third distance defined between the first block and the second block is equal to or longer than the second distance.

3. The slot die coating device according to claim 1, wherein:
the second surface of the first block is parallel to the first discharge inside portion.

4. The slot die coating device according to claim 1, wherein:
a first surface of the second block faces the second inside portion, and a second surface of the second block is parallel to the second discharge inside portion.

5. The slot die coating device according to claim 1, wherein:
the first block is in contact with the first inside portion, and the second block is in contact with the second inside portion.

6. The slot die coating device according to claim 1, wherein:
the block comprises at least one of MC nylon (Mono cast nylon) and Polytetrafluoroethylene (PTFE).

7. The slot die coating device according to claim 1, wherein:
the slot die coater comprises a first die, a second die, and a plate-shaped shim portion located between the first die and the second die.

8. The slot die coating device according to claim 7, wherein:
the shim portion comprises,
a first side portion and a second side portion connected to each other and arranged in parallel;
a central portion that connects the first side portion and the second side portion; and
a first protrusion portion extending from the first side portion in a first direction and a second protrusion portion extending from the second side portion in a second direction opposite the first direction,
wherein the first protrusion portion and the second protrusion portion form the discharge passage.

9. The slot die coating device according to claim 8, wherein:
the first side portion forms at least a part of the first inside portion, and
the second side portion forms at least a part of the second inside portion.

10. The slot die coating device according to claim 1, wherein:
the discharge passage is in communication with an outer surface of the slot die coater to form a discharge port.

11. The slot die coating device according to claim 1, further comprising a roller that moves in a direction to move an electrode current collector on which the electrode slurry is coated.

12. The slot die coating device according to claim 1, wherein the second block includes a first surface facing the second inside portion and a second surface in contact with the second discharge inside portion.

13. The slot die coating device according to claim 1, wherein the second surface of the first block contacts a terminal end of the first discharge inside portion.

14. The slot die coating device according to claim 12, wherein the second surface of the second block contacts a terminal end of the second discharge inside portion.

* * * * *